United States Patent
Righi et al.

(10) Patent No.: US 8,898,638 B1
(45) Date of Patent: *Nov. 25, 2014

(54) METHOD AND SYSTEM FOR REMOTE SOFTWARE DEBUGGING

(75) Inventors: Stefano Righi, Lawrenceville, GA (US); Eric Mills, Liburn, GA (US)

(73) Assignee: American Megatrends, Inc., Norcross, GA (US)

(*) Notice: Subject to any disclaimer, the term of this patent is extended or adjusted under 35 U.S.C. 154(b) by 85 days.

This patent is subject to a terminal disclaimer.

(21) Appl. No.: 13/240,253

(22) Filed: Sep. 22, 2011

Related U.S. Application Data

(60) Continuation of application No. 12/425,455, filed on Apr. 17, 2009, now Pat. No. 8,046,743, which is a division of application No. 10/875,641, filed on Jun. 24, 2004, now Pat. No. 7,543,277.

(60) Provisional application No. 60/483,382, filed on Jun. 27, 2003.

(51) Int. Cl.
G06F 9/44 (2006.01)
G06F 11/36 (2006.01)

(52) U.S. Cl.
CPC ................................. G06F 11/3664 (2013.01)
USPC ......................................................... 717/124

(58) Field of Classification Search
CPC .................................................. G06F 11/3664
USPC ......................................................... 717/124
See application file for complete search history.

(56) References Cited

U.S. PATENT DOCUMENTS

| | | |
|---|---|---|
| 4,589,068 A | 5/1986 | Heinen, Jr. |
| 4,979,074 A | 12/1990 | Morley et al. |
| 5,228,039 A | 7/1993 | Knoke et al. |
| 5,379,409 A | 1/1995 | Ishikawa |
| 5,388,252 A | 2/1995 | Dreste et al. |
| 5,455,933 A | 10/1995 | Schieve et al. |
| 5,491,743 A | 2/1996 | Shiio et al. |
| 5,615,331 A | 3/1997 | Toorians et al. |
| 5,625,410 A | 4/1997 | Washino et al. |
| 5,630,049 A * | 5/1997 | Cardoza et al. ................. 714/25 |
| 5,732,212 A | 3/1998 | Perholtz et al. |
| 5,777,874 A | 7/1998 | Flood et al. |
| 5,815,653 A | 9/1998 | You et al. |
| 5,819,093 A | 10/1998 | Davidson et al. |
| 5,850,562 A | 12/1998 | Crump et al. |
| 5,878,158 A | 3/1999 | Ferris et al. |
| 5,953,451 A | 9/1999 | Syeda-Mahmood |
| 5,990,852 A | 11/1999 | Szamrej |
| 5,991,546 A | 11/1999 | Chan et al. |

(Continued)

OTHER PUBLICATIONS

Shimonski, Robert; "Using Remote Desktop with Windows XP Professional"; windowsnetworking.com; Dec. 7, 2004; (Windows XP release date: Oct. 25, 2001).*

(Continued)

*Primary Examiner* — Qing Chen
*Assistant Examiner* — Clint A Thatcher
(74) *Attorney, Agent, or Firm* — Hope Baldauff LLC

(57) ABSTRACT

Methods and systems for remotely debugging a software program are provided. The methods and systems make use of a debugger application executing on a host computer and configured to communicate with a debugger module executing on a target computer via a distributed computing network, such as the Internet.

18 Claims, 5 Drawing Sheets

(56) References Cited

U.S. PATENT DOCUMENTS

| | | |
|---|---|---|
| 6,011,920 A | 1/2000 | Edwards et al. |
| 6,035,059 A | 3/2000 | Kurosawa et al. |
| 6,054,676 A | 4/2000 | Wall et al. |
| 6,055,334 A | 4/2000 | Kato |
| 6,065,072 A | 5/2000 | Flath |
| 6,067,407 A * | 5/2000 | Wadsworth et al. .......... 709/224 |
| 6,115,645 A | 9/2000 | Berar |
| 6,119,247 A | 9/2000 | House et al. |
| 6,124,811 A | 9/2000 | Acharya et al. |
| 6,137,455 A | 10/2000 | Duo |
| 6,145,088 A | 11/2000 | Stevens |
| 6,170,021 B1 | 1/2001 | Graf |
| 6,202,070 B1 | 3/2001 | Nguyen et al. |
| 6,209,023 B1 | 3/2001 | Dimitroff et al. |
| 6,219,695 B1 | 4/2001 | Guttag et al. |
| 6,236,884 B1 | 5/2001 | Hunter et al. |
| 6,243,743 B1 | 6/2001 | Freeny |
| 6,249,885 B1 | 6/2001 | Johnson et al. |
| 6,263,373 B1 | 7/2001 | Cromer et al. |
| 6,272,562 B1 | 8/2001 | Scott et al. |
| 6,288,753 B1 | 9/2001 | DeNicola et al. |
| 6,304,895 B1 | 10/2001 | Schneider et al. |
| 6,330,167 B1 | 12/2001 | Kobayashi |
| 6,360,250 B1 | 3/2002 | Anupam et al. |
| 6,377,461 B1 | 4/2002 | Ozmat et al. |
| 6,378,014 B1 | 4/2002 | Shirley |
| 6,389,464 B1 | 5/2002 | Krishnamurthy et al. |
| 6,397,256 B1 | 5/2002 | Chan et al. |
| 6,414,716 B1 | 7/2002 | Kawai |
| 6,434,003 B1 | 8/2002 | Roy et al. |
| 6,442,714 B1 | 8/2002 | Griffin et al. |
| 6,476,854 B1 | 11/2002 | Emerson et al. |
| 6,480,901 B1 | 11/2002 | Weber et al. |
| 6,552,914 B1 | 4/2003 | Chang |
| 6,560,641 B1 | 5/2003 | Powderly et al. |
| 6,594,698 B1 | 7/2003 | Chow et al. |
| 6,601,119 B1 | 7/2003 | Slutz et al. |
| 6,603,665 B1 | 8/2003 | Truong et al. |
| 6,609,034 B1 | 8/2003 | Ehrens et al. |
| 6,618,854 B1 * | 9/2003 | Mann .......................... 717/124 |
| 6,636,929 B1 | 10/2003 | Frantz et al. |
| 6,636,982 B1 | 10/2003 | Rowlands |
| 6,651,120 B2 | 11/2003 | Chiba et al. |
| 6,651,190 B1 | 11/2003 | Worley et al. |
| 6,662,217 B1 | 12/2003 | Godfrey et al. |
| 6,664,969 B1 | 12/2003 | Emerson et al. |
| 6,681,250 B1 | 1/2004 | Thomas et al. |
| 6,690,410 B1 | 2/2004 | Mochida et al. |
| 6,754,891 B1 | 6/2004 | Snyder et al. |
| 6,779,004 B1 | 8/2004 | Zintel |
| 6,816,917 B2 | 11/2004 | Dicorpo et al. |
| 6,816,963 B1 | 11/2004 | Krithivas et al. |
| 6,820,267 B2 | 11/2004 | Christensen et al. |
| 6,823,401 B2 | 11/2004 | Feather et al. |
| 6,825,846 B2 | 11/2004 | Mondal |
| 6,857,005 B2 | 2/2005 | Kistler et al. |
| 6,859,882 B2 | 2/2005 | Fung |
| 6,894,906 B2 | 5/2005 | Sivertsen |
| 6,907,519 B2 | 6/2005 | Desoli |
| 6,952,743 B2 | 10/2005 | Ortega et al. |
| 6,959,380 B2 | 10/2005 | Dake et al. |
| 6,963,425 B1 | 11/2005 | Nair et al. |
| 6,990,577 B2 * | 1/2006 | Autry .......................... 713/100 |
| 6,993,747 B1 | 1/2006 | Friedman |
| 7,003,563 B2 | 2/2006 | Leigh et al. |
| 7,039,229 B2 | 5/2006 | Lin et al. |
| 7,076,400 B2 | 7/2006 | Dulberg et al. |
| 7,085,814 B1 | 8/2006 | Gandhi et al. |
| 7,149,796 B2 | 12/2006 | McDaniel-Sanders et al. |
| 7,165,041 B1 | 1/2007 | Guheen et al. |
| 7,181,510 B2 | 2/2007 | Emerson et al. |
| 7,206,875 B2 | 4/2007 | Marushak et al. |
| 7,209,874 B2 | 4/2007 | Salmonsen |
| 7,231,606 B2 | 6/2007 | Miller et al. |
| 7,233,336 B2 | 6/2007 | Mondal |
| 7,260,624 B2 | 8/2007 | Sivertsen et al. |
| 7,289,334 B2 | 10/2007 | Behrens et al. |
| 7,299,463 B2 | 11/2007 | Brannock et al. |
| 7,349,956 B2 | 3/2008 | Anderson et al. |
| 7,412,625 B2 | 8/2008 | Shankar et al. |
| 7,418,141 B2 | 8/2008 | Messer et al. |
| 7,454,490 B2 | 11/2008 | Sivertsen |
| 7,496,492 B2 | 2/2009 | Dai |
| 7,555,421 B1 | 6/2009 | Beckett et al. |
| 7,640,325 B1 | 12/2009 | DeKoning et al. |
| 7,657,665 B2 | 2/2010 | Dalton et al. |
| 7,702,763 B2 | 4/2010 | Slater et al. |
| 7,801,158 B2 | 9/2010 | Voit et al. |
| 7,966,391 B2 | 6/2011 | Anderson et al. |
| 8,069,257 B1 | 11/2011 | Bhatia et al. |
| 2001/0027465 A1 | 10/2001 | Hammelbacher |
| 2001/0037366 A1 | 11/2001 | Web et al. |
| 2002/0040418 A1 | 4/2002 | Bress et al. |
| 2002/0078188 A1 | 6/2002 | Anand et al. |
| 2002/0083156 A1 | 6/2002 | Wyscoczynski |
| 2002/0087949 A1 | 7/2002 | Golender et al. |
| 2002/0097234 A1 | 7/2002 | Sauber |
| 2002/0103882 A1 | 8/2002 | Johnston et al. |
| 2002/0124128 A1 | 9/2002 | Qiu |
| 2002/0174415 A1 | 11/2002 | Hines |
| 2002/0178320 A1 | 11/2002 | Wu |
| 2002/0184165 A1 | 12/2002 | Deboer et al. |
| 2002/0194403 A1 | 12/2002 | Pua et al. |
| 2002/0199035 A1 | 12/2002 | Christensen et al. |
| 2003/0023435 A1 | 1/2003 | Josephson |
| 2003/0035049 A1 | 2/2003 | Dickens et al. |
| 2003/0058248 A1 | 3/2003 | Hockmuth et al. |
| 2003/0074606 A1 | 4/2003 | Boker |
| 2003/0083842 A1 | 5/2003 | Miller et al. |
| 2003/0110244 A1 | 6/2003 | Mondal |
| 2003/0120977 A1 * | 6/2003 | Tang .............................. 714/38 |
| 2003/0135674 A1 | 7/2003 | Mason et al. |
| 2003/0156132 A1 | 8/2003 | Gn et al. |
| 2003/0177111 A1 | 9/2003 | Egendorf et al. |
| 2003/0200273 A1 | 10/2003 | Khanna et al. |
| 2003/0216891 A1 | 11/2003 | Wegener |
| 2003/0226015 A1 | 12/2003 | Neufeld et al. |
| 2004/0003317 A1 | 1/2004 | Kwatra et al. |
| 2004/0054838 A1 | 3/2004 | Hoese et al. |
| 2004/0059782 A1 | 3/2004 | Sivertsen |
| 2004/0139240 A1 | 7/2004 | DiCorpo et al. |
| 2004/0158614 A1 | 8/2004 | Williams |
| 2004/0199699 A1 | 10/2004 | Bobbitt et al. |
| 2004/0215617 A1 | 10/2004 | Ramsey et al. |
| 2004/0230668 A1 | 11/2004 | Carnahan et al. |
| 2004/0236843 A1 | 11/2004 | Wing et al. |
| 2004/0255276 A1 | 12/2004 | Rovang |
| 2005/0020144 A1 | 1/2005 | Lunecki et al. |
| 2005/0021654 A1 | 1/2005 | Kern et al. |
| 2005/0021870 A1 | 1/2005 | Carnahan et al. |
| 2005/0044244 A1 | 2/2005 | Warwick et al. |
| 2005/0066000 A1 | 3/2005 | Liaw et al. |
| 2005/0086670 A1 | 4/2005 | Christensen et al. |
| 2005/0125519 A1 | 6/2005 | Yang et al. |
| 2005/0138346 A1 | 6/2005 | Cauthron |
| 2006/0098670 A1 | 5/2006 | Voit et al. |
| 2006/0189900 A1 | 8/2006 | Flaherty |
| 2006/0195042 A1 | 8/2006 | Flaherty |
| 2007/0168746 A1 | 7/2007 | Righi et al. |
| 2011/0015918 A1 | 1/2011 | Kalbarga |

OTHER PUBLICATIONS

"Cable Allows Users to Extend DVI Connections," Jul. 31, 2001, *The Mac Observer*, printed from http://www.macobserver.com/article/2001/07/31.11.shtml, 4 pages.

"New KVM Switching System Controls 2,048 Servers Using Cat5 Cable" printout from Raritan website found at http://www.raritan.com//about/abt_press_detail.aspx?&status=4&articleid=127, printed May 23, 2006, 2 pages.

"Z-Series Information Page" printout from Raritan website found at www.Raritan.com/products/kvm_switches/z_series/prd_line.aspx. Printed Feb. 10, 2006, 1 page.

(56) References Cited

OTHER PUBLICATIONS

American Megatrends, Inc., AMIBIOS8, Introduction to AMIBIOS8™: Overview of Key Features in the Latest AMIBIOS®, Version 1.20, Mar. 25, 2002, 22 pages.

American Megatrends, Inc., AMI Debug Source Level Modular Software Debugger, Data Sheet, Dec. 14, 2004, 2 pages.

American Megatrends, Inc. AMIDebug User's Guide (Version 2.0), 2002, 101 pages.

American Megatrends, Inc. AMIDiag for Windows User's Guide (Version 2.0), Feb. 25, 2002. http://ami.com/support/docc/MAN-DIAG-WIN.pdf, 108 pages.

AVIT Research, Ltyd., I$^2$C Bus Tool, printed from www.avitresearch.co.uk/ on Aug. 29, 2005, 4 pages.

Calibre, "UCA93LV: USB—I$^2$C Communications Adapter for PCs" Jan. 28, 2005, 2 pages.

Raritan Computer, Inc., "Raritan Announces New Paragon CIMs with Innovative DirectConnect Technology," a press release, Jan. 14, 2002, printed from www.raritan.com on Jan. 27, 2005, 2 pages.

Saelig Online Store, UCA93LV, printed from www.saelig.com on Aug. 29, 2005, 2 pages.

QuikSpecs: Compaq PCI Card KVM Switches, Version 5, Mar. 13, 2003, 5 pps.

U.S. Official Action dated Aug. 13, 2003 in U.S. Appl. No. 10/016,484, filed Dec. 10, 2001, Inventor: Umasankar Mondal.

U.S. Official Action dated Mar. 8, 2004 in U.S. Appl. No. 10/016,484, filed Dec. 10, 2001, Inventor: Umasankar Mondal.

U.S. Official Action dated Jun. 22, 2004 in U.S. Appl. No. 10/016,484, filed Dec. 10, 2001, Inventor: Umasankar Mondal.

U.S. Notice of Allowance and Allowability dated Jul. 15, 2004 in U.S. Appl. No. 10/016,484, filed Dec. 10, 2001, Inventor: Umasankar Mondal.

U.S. Official Action dated Feb. 23, 2004 in U.S. Appl. No. 10/247,876, filed Sep. 20, 2002, Inventor: Clas G. Sivertsen.

U.S. Official Action dated Aug. 3, 2004 in U.S. Appl. No. 10/247,876, filed Sep. 20, 2002, Inventor: Clas G. Sivertsen.

U.S. Official Action dated Feb. 3, 2005 in U.S. Appl. No. 10/247,876, filed Sep. 20, 2002, Inventor: Clas G. Sivertsen.

U.S. Official Action dated Aug. 8, 2005 in U.S. Appl. No. 10/247,876, filed Sep. 20, 2002, Inventor: Clas G. Sivertsen.

U.S. Official Action dated Feb. 24, 2006 in U.S. Appl. No. 10/247,876, filed Sep. 20, 2002, Inventor: Clas G. Sivertsen.

U.S. Official Action dated Aug. 17, 2006 in U.S. Appl. No. 10/247,876, filed Sep. 20, 2002, Inventor: Clas G. Sivertsen.

U.S. Notice of Allowance and Allowability dated Apr. 11, 2007 in U.S. Appl. No. 10/247,876, filed Sep. 20, 2002, Inventor: Clas G. Sivertsen.

U.S. Official Action dated Sep. 19, 2006 in U.S. Appl. No. 10/403,198, filed Mar. 31, 2003, Inventor: Jason A. Messer.

U.S. Official Action dated Mar. 6, 2007 in U.S. Appl. No. 10/403,198, filed Mar. 31, 2003, Inventor: Jason A. Messer.

U.S. Notice of Allowance/Allowability dated May 31, 2007 in U.S. Appl. No. 10/403,198, filed Mar. 31, 2003, Inventor: Jason A. Messer.

U.S. Notice of Allowance and Allowability dated Sep. 18, 2007 in U.S. Appl. No. 10/403,198, filed Mar. 31, 2003, Inventor: Jason A. Messer.

U.S. Notice of Allowance and Allowability dated Jan. 11, 2008 in U.S. Appl. No. 10/403,198, filed Mar. 31, 2003, Inventor: Jason A. Messer.

U.S. Notice of Allowance and Allowability dated May 13, 2008 in U.S. Appl. No. 10/403,198, filed Mar. 31, 2003, Inventor: Jason A. Messer.

U.S. Official Action dated Jan. 24, 2006 in U.S. Appl. No. 10/446,044, filed May 27, 2003, Inventor: Subramonian Shankar.

U.S. Official Action dated Jul. 14, 2006 in U.S. Appl. No. 10/446,044, filed May 27, 2003, Inventor: Subramonian Shankar.

U.S. Official Action dated Oct. 5, 2006 in U.S. Appl. No. 10/446,044, filed May 27, 2003, Inventor: Subramonian Shankar.

U.S. Official Action dated Apr. 5, 2007 in U.S. Appl. No. 10/446,044, filed May 27, 2003, Inventor: Subramonian Shankar.

U.S. Official Action dated Sep. 18, 2007 in U.S. Appl. No. 10/446,044, filed May 27, 2003, Inventor: Subramonian Shankar.

U.S. Official Action dated Jan. 8, 2008 in U.S. Appl. No. 10/446,044, filed May 27, 2003, Inventor: Subramonian Shankar.

U.S. Notice of Allowance and Allowability dated Jun. 9, 2008 in U.S. Appl. No. 10/446,044, filed May 27, 2003, Inventor: Subramonian Shankar.

U.S. Official Action dated Sep. 11, 2006 in U.S. Appl. No. 10/462,509, filed Jun. 16, 2003, Inventor: Gene Rovang.

U.S. Official Action dated Mar. 6, 2007 in U.S. Appl. No. 10/462,509, filed Jun. 16, 2003, Inventor: Gene Rovang.

U.S. Official Action dated Jun. 29, 2007 in U.S. Appl. No. 10/462,509, filed Jun. 16, 2003, Inventor: Gene Rovang.

U.S. Notice of Allowance and Allowability dated Nov. 1, 2007 in U.S. Appl. No. 10/462,509, filed Jun. 16, 2003, Inventor: Gene Rovang.

U.S. Official Action dated Nov. 29, 2007 in U.S. Appl. No. 10/462,509, filed Jun. 16, 2003, Inventor: Gene Rovang.

U.S. Official Action dated Jul. 9, 2008 in U.S. Appl. No. 10/462,509, filed Jun. 16, 2003, Inventor: Gene Rovang.

U.S. Notice of Allowance / Allowability dated Jan. 26, 2009 in U.S. Appl. No. 10/462,509, filed Jun. 16, 2003, Inventor: Gene Rovang.

U.S. Appl. No. 10/790,160, filed Mar. 1, 2004, entitled "Method, System and Apparatus for Communicating with a Computer Management Device," Inventor: Subash Kalbarga.

U.S. Official Action dated Dec. 17, 2007 in U.S. Appl. No. 10/790,160, filed Mar. 1, 2004, Inventor: Subash Kalbarga.

U.S. Official Action dated Jun. 25, 2008 in U.S. Appl. No. 10/790,160, filed Mar. 1, 2004, Inventor: Subash Kalbarga.

U.S. Official Action dated Jan. 7, 2009 in U.S. Appl. No. 10/790,160, filed Mar. 1, 2004, Inventor: Subash Kalbarga.

U.S. Official Action dated Jul. 1, 2009 in U.S. Appl. No. 10/790,160, filed Mar. 1, 2004, Inventor: Subash Kalbarga.

U.S. Official Action dated Dec. 23, 2009 in U.S. Appl. No. 10/790,160, filed Mar. 1, 2004, Inventor: Subash Kalbarga.

U.S. Notice of Allowance / Allowability dated Jun. 24, 2010 in U.S. Appl. No. 10/790,160, filed Mar. 1, 2004, Inventor: Subash Kalbarga.

U.S. Notice of Allowance and Allowability dated Nov. 10, 2004 in U.S. Appl. No. 10/867,348, filed Jun. 14, 2004, Inventor: Clas G. Sivertsen.

U.S. Official Action dated Feb. 27, 2007 in U.S. Appl. No. 10/867,406, filed Jun. 14, 2004, Inventor: Clas G. Sivertsen.

U.S. Official Action dated Aug. 10, 2007 in U.S. Appl. No. 10/867,406, filed Jun. 14, 2004, Inventor: Clas G. Sivertsen.

U.S. Official Action dated Dec. 27, 2007 in U.S. Appl. No. 10/867,406, filed Jun. 14, 2004, Inventor: Clas G. Sivertsen.

U.S. Notice of Allowance / Allowability dated Jul. 23, 2008 in U.S. Appl. No. 10/867,406, filed Jun. 14, 2004, Inventor: Clas G. Sivertsen.

U.S. Appl. No. 10/875,641, filed Jun. 24, 2004, Entitled "Method and System for Remote Software Debugging ", Inventors: Stefano Righi and Eric Mills.

U.S. Official Action dated Jul. 27, 2007 in U.S. Appl. No. 10/875,641, filed Jun. 24, 2004, Inventors: Stefano Righi and Eric Mills.

U.S. Official Action dated Jan. 10, 2008 in U.S. Appl. No. 10/875,641, filed Jun. 24, 2004, Inventors: Stefano Righi and Eric Mills.

U.S. Official Action dated Jun. 3, 2008 in U.S. Appl. No. 10/875,641, filed Jun. 24, 2004, Inventors: Stefano Righi and Eric Mills.

U.S. Notice of Allowance / Allowability dated Jan. 8, 2009 in U.S. Appl. No. 10/875,641, filed Jun. 24, 2004, Inventors: Stefano Righi and Eric Mills.

U.S. Appl. No. 10/926,241, filed Aug. 25, 2004, entitled "Apparatus, Methods, and Systems for Redirecting Input and Output for Multiple Computers," Inventor: Clas Gerhard Sivertsen.

U.S. Official Action dated Sep. 8, 2008 in U.S. Appl. No. 10/926,241, filed Aug. 25, 2004, Inventor: Clas G. Sivertsen.

U.S. Notice of Allowance / Allowability dated Dec. 2, 2008 in U.S. Appl. No. 10/926,241, filed Aug. 25, 2004, Inventor: Clas G. Sivertsen.

U.S. Official Action dated Apr. 18, 2006 in U.S. Appl. No. 10/966,221, filed Oct. 15, 2004, Inventor: Umasankar Mondal.

U.S. Official Action dated Sep. 5, 2006 in U.S. Appl. No. 10/966,221, filed Oct. 15, 2004, Inventor: Umasankar Mondal.

(56) References Cited

OTHER PUBLICATIONS

U.S. Notice of Allowance and Allowability dated Jan. 5, 2007 in U.S. Appl. No. 10/966,221, filed Oct. 15, 2004, Inventor: Umasankar Mondal.
U.S. Official Action dated May 14, 2008 in U.S. Appl. No. 11/300,045, filed Dec. 14, 2005, Inventor: Stefano Righi.
U.S. Official Action dated Dec. 2, 2008 in U.S. Appl. No. 11/300,045, filed Dec. 14, 2005, Inventor: Stefano Righi.
U.S. Official Action dated May 27, 2009 in U.S. Appl. No. 11/300,045, filed Dec. 14, 2005, Inventor, Stefano Righi.
U.S. Official Action dated Dec. 8, 2009 in U.S. Appl. No. 11/300,045, filed Dec. 14, 2005, Inventor: Stefano Righi.
U.S. Official Action dated Nov. 23, 2010 in U.S. Appl. No. 11/300,045, filed Dec. 14, 2005, Inventor: Stefano Righi.
U.S. Notice of Allowance and Allowability dated Apr. 14, 2011 in U.S. Appl. No. 11/300,045, filed Dec. 14, 2005, Inventor: Stefano Righi.
U.S. Appl. No. 12/395,015, filed Feb. 27, 2009, entitled "Redirecting Input and Outuput for Multiple Computers," First Named Inventor: Clas G. Sivertsen.
U.S. Official Action dated Dec. 30, 2009 in U.S. Appl. No. 12/395,015, filed Feb. 27, 2009, Inventor: Clas G. Sivertsen.
U.S. Official Action dated Jun. 18, 2010 in U.S. Appl. No. 12/395,015, filed Feb. 27, 2009, Inventor: Clas G. Sivertsen.
U.S. Notice of Allowance / Allowability dated Aug. 30, 2010 in U.S. Appl. No. 12/395,015, filed Feb. 27, 2009, Inventor: Clas G. Sivertsen.
U.S. Appl. No. 12/395,022, filed Feb. 27, 2009, entitled "Redirecting Input and Outuput for Multiple Computers," First Named Inventor: Clas G. Sivertsen.
U.S. Official Action dated Aug. 24, 2009 in U.S. Appl. No. 12/395,022, filed Feb. 27, 2009, Inventor: Clas G. Sivertsen.
U.S. Notice of Allowance / Allowability dated Mar. 11, 2010 in U.S. Appl. No. 12/395,022, filed Feb. 27, 2009, Inventor: Clas G. Sivertsen.
U.S. Appl. No. 12/395,028 filed Feb. 27, 2009, entitled "Redirecting Input and Outuput for Multiple Computers," First Named Inventor: Clas G. Sivertsen.
U.S. Official Action dated Apr. 23, 2010 in U.S. Appl. No. 12/395,028, filed Feb. 27, 2009, Inventor: Clas G. Sivertsen.
U.S. Notice of Allowance / Allowability dated Sep. 23, 2010 in U.S. Appl. No. 12/395,028, filed Feb. 27, 2009, Inventor: Clas G. Sivertsen.
U.S. Notice of Allowance / Allowability dated Jun. 22, 2011 in U.S. Appl. No. 12/425,455, filed Apr. 17, 2009, First Named Inventor: Stefano Righi.
U.S. Appl. No. 12/470,854, filed May 22, 2009, entitled "Method and System for Remote Software Testing" First Named Inventor: Gene Rovang.
U.S. Notice of Allowance / Allowability dated Jan. 3, 2011 in U.S. Appl. No. 12/470,854, filed May 22, 2009, Inventor: Gene Rovang.
U.S. Official Action dated Aug. 16, 2011 in U.S. Appl. No. 12/889,933, filed Sep. 24, 2010, First Named Inventor: Subash Kalbarga.
U.S. Appl. No. 12/948,400, filed Nov. 19, 2010, entitled "Redirecting Input and Output for Multiple Computers," Inventor: Clas. G. Sivertsen.
U.S. Official Action dated Dec. 27, 2010 in U.S. Appl. No. 12/948,400, filed Nov. 19, 2010, Inventor: Clas G. Sivertsen.
U.S. Notice of Allowance / Allowability dated Apr. 21, 2011 in U.S. Appl. No. 12/948,400, filed Nov. 17, 2010, Inventor Clas G. Sivertsen.
U.S. Appl. No. 13/079,141, filed Apr. 4, 2011, entitled "Method and System for Remote Software Testing", First Named Inventor:Gene Rovang.
U.S. Appl. No. 13/183,076, filed Jul. 14, 2011, entitled "System and Method for Debugging a Target Computer Using SMBUS", First Named Inventor Stefano Righi.
U.S. Official Action dated Jul. 20, 2012 in 13/183,076 entitled "System and Method for Debugging a Target Computer Using SMBUS", First Named Inventor: Righi.
U.S. Official Action dated Nov. 13, 2012 in U.S. Appl. No. 13/079,141.
U.S. Official Action dated Nov. 20, 2012 in U.S. Appl. No. 13/183,076.
U.S. Official Action dated Jun. 5, 2012 in U.S. Appl. No. 12/889,933.
U.S. Notice of Allowance/Allowability dated Oct. 1, 2012 in U.S. Appl. No. 12/889,933.
U.S. Notice of Allowance/Allowability dated Apr. 11, 2013 in U.S. Appl. No. 13/079,141.
U.S. Notice of Allowance/Allowability dated May 15, 2013 in U.S. Appl. No. 13/183,076.
U.S. Notice of Allowance/Allowability dated Jun. 20, 2013 in U.S. Appl. No. 13/183,076.

\* cited by examiner

METHOD AND SYSTEM FOR REMOTE SOFTWARE DEBUGGING

CROSS-REFERENCE TO RELATED APPLICATIONS

This application is a continuation of and claims priority to U.S. patent application Ser. No. 12/425,455, now U.S. Pat. No. 8,046,743, entitled "Method and System for Remote Software Debugging," filed Apr. 17, 2009, which is a division of U.S. patent application Ser. No. 10/875,641, now U.S. Pat. No. 7,543,277 entitled "Method and System for Remote Software Debugging," filed Jun. 24, 2004, which claims the benefit of provisional U.S. Patent Application No. 60/483,382, entitled "Method and System For Remote Software Debugging," filed on Jun. 27, 2003, the entire contents of which are expressly incorporated herein by reference.

TECHNICAL FIELD

Embodiments of the invention relate generally to the field of software debugging. More particularly, embodiments of the invention relate to the field of debugging software remotely.

BACKGROUND OF THE INVENTION

One of the most important parts of the software development process is the process of debugging. Debugging refers to the process of identifying and eliminating errors within a software program. A debugging application program, called a debugger, provides tools to assist a programmer in locating and correcting program errors. For instance, most debuggers provide tools for stepping through the executing code of a program, monitoring the status of input/output ports, and for monitoring and modifying the contents of memory locations and central processing unit ("CPU") registers.

Traditionally, a debugger must be run directly on the computer system that is executing the software that is being debugged. This, however, greatly hinders the software debugging process because the programmer performing the debugging must be in close proximity to the system being debugged. Other systems allow the debugging of one computer (the "target computer") through another computer (the "host computer") connected via a locally-connected non-network cable (i.e. a serial/USB/parallel cable) cable. However, these systems also require that the programmer be in relatively close proximity to the system being debugged. This may be extremely inconvenient when it is necessary to debug a computer system that is located across the country or even across the world.

Using a non-network connection between the target and the host limits the distance that the target may be located from the host to the length of the cable which, in many cases, is a short distance. Moreover, because a non-network cable connection is a simple point-to-point physical connection, the connection must be physically removed and then attached to each host computer upon which debugging operations are to be performed. Changing cables in this manner can be time consuming and frustrating for the programmer responsible for debugging the target computer.

It is with respect to these considerations and others that the various embodiments of the present invention have been made.

SUMMARY OF THE INVENTION

In accordance with the present invention, the above and other problems are solved by methods and systems for remotely debugging a software program. The systems make use of a debugger application executing on a host computer and configured to communicate with a debugger module executing on a target computer via a distributed computing network, such as the Internet. By allowing the debugger application executing on the host computer to communicate over a standard network connection with the debugger module executing on the target computer, the physical limitations of previous solutions utilizing locally-connected non-network cables to connect the host and target computers are overcome. Moreover, because a standard network connection is utilized between the debugger application executing on the host computer and the debugger module executing on the target computer, a new network connection with a different target computer may be quickly and easily established without the need to physically relocate cables.

According to additional aspects of the invention, a host computer is provided that includes a debugger application that facilitates the debugging of a software program. The debugger application is configurable for communication with a debugger module executing on a target computer via a local area network ("LAN") adapter connected to a network, such as the Internet. According to this aspect of the invention, the target computer includes a software program to be debugged, such as a basic input/output system ("BIOS").

In one embodiment, the BIOS includes a debugger module operative for communication with the debugger application. The BIOS also includes support for a pre-boot execution environment ("PXE"). Through the PXE, the debugger module may communicate with a network via a LAN adapter. Communication may be made even though the target computer has not been booted with an operating system program. The debugger application executing on the host computer may communicate with the debugger module executing on the target computer via the network in the same manner as if the host and target computers were connected locally via a non-network cable, such as a serial or USB cable.

According to another aspect of the invention, the target computer is equipped with a debugger module but is not equipped with a PXE environment. Rather, the debugger module is operative to communicate with another computer via a locally connected non-network adapter, such as a serial port adapter. In one embodiment of the invention, a serial-to-network bridge is provided that is connected to a serial port adapter, on the one hand, and to the communications network on the other hand. The serial-to-network adapter converts communications received from the network to a format compatible with the serial port. Furthermore, the serial-to-network adapter converts communications received from the serial port adapter to a format compatible with the network. In this manner, the debugger application executing on the host computer may communicate with the debugger module executing on the target computer via the network, the serial-to-network bridge, and the serial port adapter supported in the target computer. The debugger module may be operative to communicate with other types of locally connected non-network adapters (USB, parallel, etc.) and a network bridge may be provided to convert between the non-network adapter and the network.

According to yet another embodiment of the invention, the debugger module contained within the BIOS of the target computer is operative to communicate with another computer via a locally connectable non-network adapter, such as a serial port adapter, USB adapter, or parallel adapter, installed in the target computer. According to this aspect of the invention, the target computer is also equipped with an operating system independent video and input/output redirection device (referred to herein as a "redirection device"). In addition to other functions, the redirection device is operative to provide a locally connectable non-network adapter, such as a serial port adapter, and a network adapter. According to this aspect of the invention, a compatible non-network adapter of the target computer is connected to the non-network adapter of the redirection device. For instance, a serial port adapter on the target computer may be connected to a serial port adapter provided on the redirection device. A software component executing on the redirection device is operative to convert data received at the non-network adapter to a format compatible with a network for transmission to the host computer. Similarly, the redirection device is operative to convert data received from the debugger application executing on the host computer via the network to a format compatible with the non-network communications adapter. In this manner, the debugger application can communicate with the debugger module via the network, the redirection device, and the non-network communications adapter contained within the target computer.

According to other aspects of the invention, the redirection device contained in the target computer is operative to transmit the video output of the target computer to the host computer via the network connection. The redirection device can also receive user input commands provided at the host computer and pass the input commands to the target computer as if the input commands were physically generated by a user at the target computer. In this manner, a user of the host computer may control the operation of the target computer from a remote location, regardless of the type of operating system utilized by the target computer. For instance, a user of the host computer may perform functions on the target computer, such as powering on or off the target computer, remotely viewing the video output of the target computer, and performing other functions.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computer system and encoding a computer program of instructions for executing a computer process.

These and various other features as well as advantages, which characterize the present invention, will be apparent from a reading of the following detailed description and a review of the associated drawings.

DETAILED DESCRIPTION OF AN ILLUSTRATIVE EMBODIMENT

As described briefly above, embodiments of the present invention provide methods and systems for remotely debugging a computer software program. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
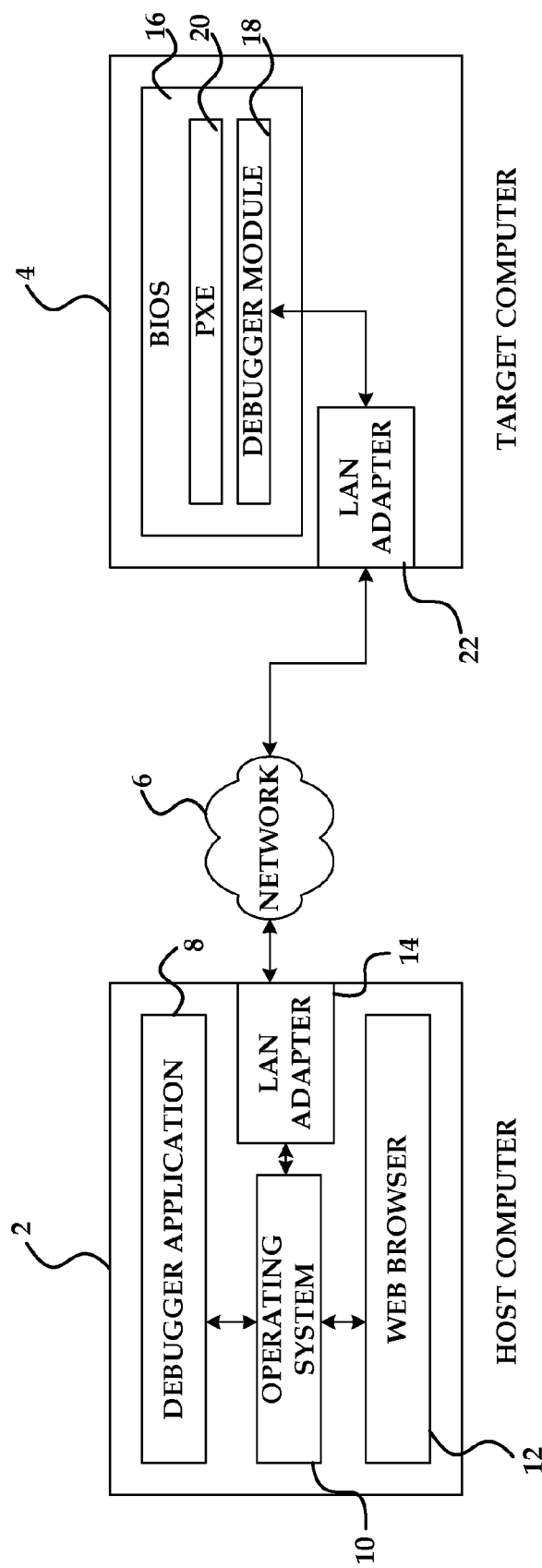
FIGS. 1-3 are computer system diagrams illustrating various hardware and software architectures for a host computer and a target computer utilized in the various embodiments of the invention.
Figure 2:
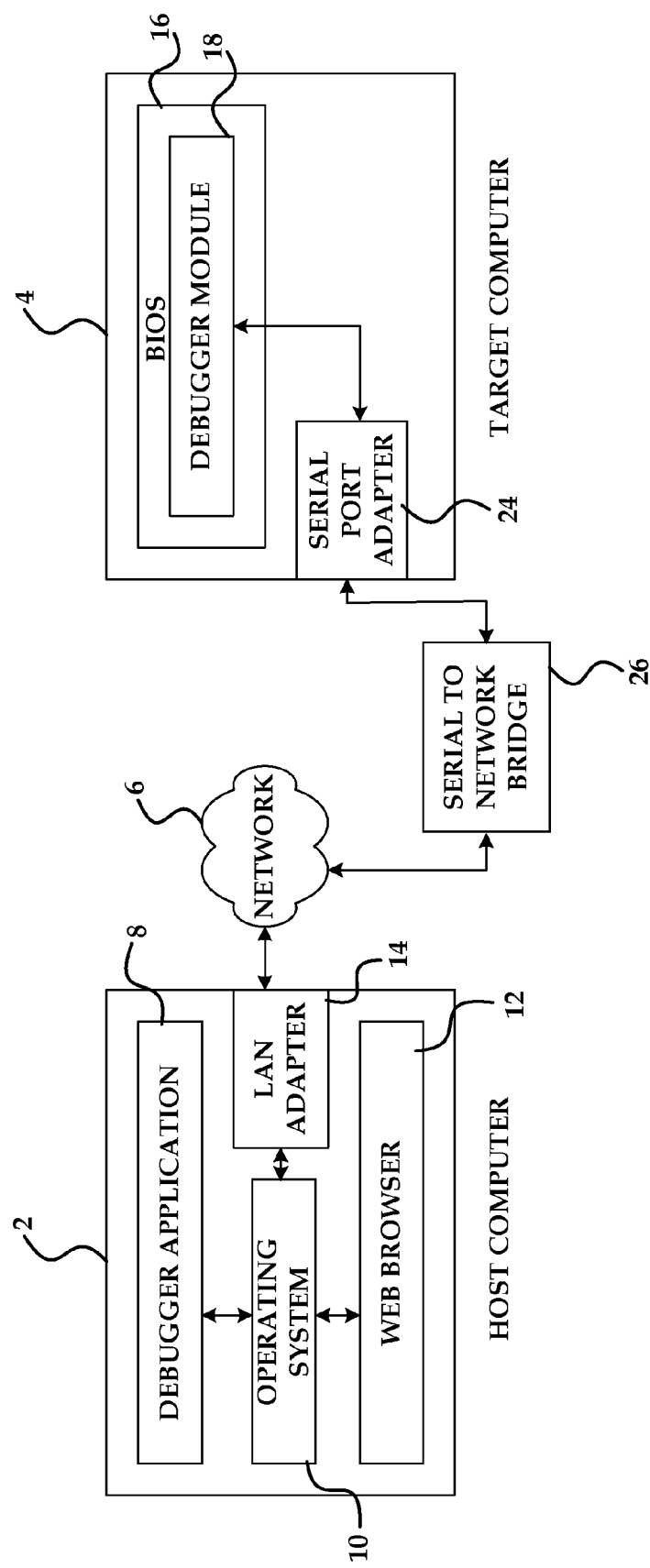
Figure 3:
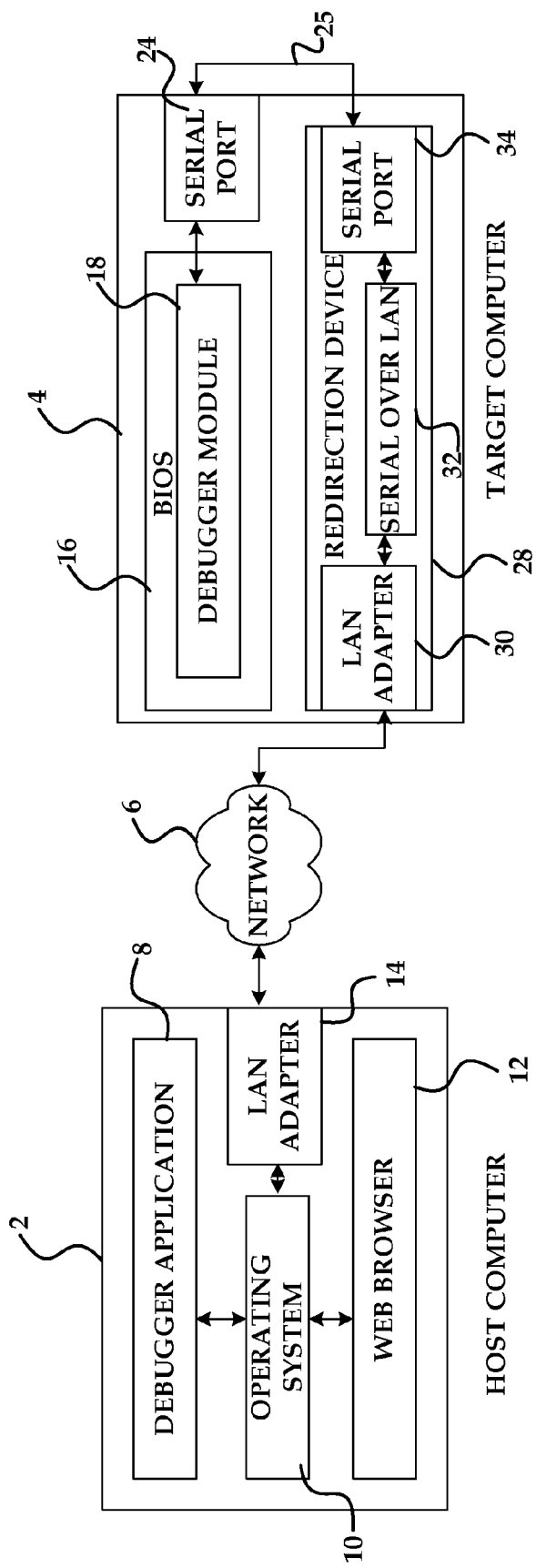

Referring now to the drawings, in which like numerals represent like elements throughout the several figures, aspects of the present invention and the exemplary operating environment will be described. FIGS. 1-3 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a system for remotely debugging a computer program provided in one embodiment of the invention will be described. As shown in FIG. 1, the system includes a host computer 2. The host computer 2 comprises a standard personal or server computer operative to execute a debugger application 8, such as the AMIDEBUG debugging application from AMERICAN MEGATRENDS of Norcross, Ga. The host computer 2 is also operative to execute an operating system 10 suitable for controlling the operation of a desktop or server computer such as the WINDOWS XP operating system from MICROSOFT CORPORATION of Redmond, Wash., the LINUX operating system, or other type of computer operating system. The host computer 2 may further be operative to execute a web browser application program 12, such as the INTERNET EXPLORER web browser from MICROSOFT CORPORATION. Alternatively, the host computer 2 may comprise another type of computing device operative to access a network 6, such as a personal digital assistant or other type of computer. The host computer 2 is also connected to a network 6, such as the Internet, through a LAN adapter 14. It should be appreciated that the host computer 2 may be configured for communication over various types of local and distributed computing networks. It should also be appreciated that the computer 2 includes additional conventional computing components not shown in FIG. 1, but recognized by those skilled in the art.

The system for remote debugging shown in FIG. 1 further includes a target computer 4. The target computer 4 also comprises a personal or server computer. According to one embodiment of the invention, the target computer 4 is configured with a BIOS 16 operative to control the execution of the target computer 4 and to provide other functionality for remote debugging. In particular, the BIOS 16 is configured with a PXE environment 20 that allows communications with the network 6 through the LAN adapter 22 prior to booting an operating system on the target computer 4. The BIOS 16 is also configured with a debugger module 18. The debugger module 18 is operative to utilize the PXE environment 20 to communicate with the debugger application 8 via the LAN adapter 22 and the network 6. In particular, the debugger module 18 is configured to receive and respond to requests for debugging-related information from the debugger application 8, such as the contents of registers or memory locations, to receive and respond to commands received from the debugger application 8, such as for stepping the CPU of the target computer 4 through the execution of program code, and for performing other debugging-related functions.

In order to remotely debug aspects of the BIOS 16 and other aspects of the execution of the target computer 4, the debugger application 8 is configured to communicate with the target computer 4 at a network address utilized by the LAN adapter 22. Once the debugger application 8 has been supplied with the network address of the LAN adapter 22, communication may commence between the debugger application 8 and the debugger module 18. In particular, commands may be transmitted from the debugger application 8 to the debugger module 18 for debugging the BIOS 16. Moreover, data and other information regarding the execution of the BIOS 16 or other program modules on the target computer 4 may be returned to the debugger application 8 from the debugger module 18.

According to one embodiment of the invention, the BIOS 16 is configured with a debugger module 18 operative to allow the remote updating of the BIOS 16. In this manner, the debugger application 8 may be utilized to identify execution errors within the BIOS 16. Once errors have been identified and the BIOS code has been corrected, a new version of the BIOS 16 may be uploaded through the network 6 to the target computer 4 and programmed, or "flashed", into the non-volatile storage area of the target computer 4 that stores the BIOS 16. It should be appreciated that any conventional debugging function supported by the debugger application 8 may be performed over the network 6 utilizing the system illustrated in FIG. 1.

Turning now to FIG. 2, another system for remotely debugging a BIOS 16 executing on a target computer 4 will be described. In the embodiment illustrated in FIG. 2, the BIOS 16 is not necessarily equipped with the PXE environment 20 shown in FIG. 1. Rather, the debugger module 18 is configured for communicating with a host computer 2 via a non-network communications adapter, such as the serial port adapter 24. However, rather than connecting the host computer 2 to the target computer 4 via a non-network cable, such as a serial cable, a serial-to-network bridge 26 is provided.

The serial-to-network bridge 26 includes a network adapter programmed with a network address. By using the network address, the debugger application 8 can communicate with the serial-to-network bridge 26. The serial-to-network bridge 26 is also operative to convert data received from the debugger module 18 via the serial port adapter 24 to a format compatible for transmission on the network 6. Similarly, the serial-to-network bridge 26 is operative to convert data received from the debugger application 8 via the network 6 to a format compatible with the serial port adapter 24. Communications performed in this manner may be described herein as "serial over LAN." Utilizing such "serial over LAN" communications, the debugger application 8 can communicate with the debugger module 18 executing on the target computer 4 via the LAN adapter 14, the network 6, the serial-to-network bridge 26, and the serial port adapter 24. Through this communication path, any of the traditional debugging functions described above with respect to FIG. 1, including the updating of the BIOS 16, may be performed.

It should be appreciated that other types of non-network communications adapters may be utilized in place of the serial port adapter 24, such as USB adapters, parallel communications adapters, and others known to those skilled in the art. Moreover, it should be appreciated that a bridge 26 compatible for use with other types of non-network communications adapters may be utilized. For instance, when a USB adapter is utilized on the target computer 4, a USB-to-network bridge may be utilized. Similarly, when a parallel port is utilized on the target computer 4, a parallel-to-network bridge may be utilized.

Referring now to FIG. 3, yet another embodiment of the invention will be described. In the embodiment of the invention shown in FIG. 3, the target computer 4 is equipped with a debugger module 18 operative to communicate with a host computer 2 via a non-network communications adapter, such as the serial port adapter 24. It should be appreciated that other types of non-network communications adapters may be utilized, such as USB adapters, parallel communications adapters, and others known to those skilled in the art.

The target computer 4 is further equipped with an operating system independent video and input/output redirection device 28. Among other functions, the redirection device 28 receives the video output of the target computer 4 and compresses the video output for transmission to a plug-in executing within the web browser 12 on the host computer 2. The plug-in executing within the web browser 12 is operative to decompress the data stream and to display the video output of the target computer 4 on the host computer 2. The displayed output may include screen displays generated by the BIOS 16 or other application programs executing on the target computer 4. In order to provide this functionality, the video output of the target computer 4 may be routed to the redirection device 28, either through an external cable or through an internal connection to the video output circuitry of the target computer 4.

The plug-in executing within the web browser 12 is also operative to receive user input commands, such as mouse or keyboard commands, generated at the host computer 2 and to transmit the commands to the redirection device 28. The redirection device 28 can receive the user input commands from the plug-in executing within the browser 12 and provide the input commands to the target computer 4 as if the input commands were physically generated by a user at the target computer 4. In order to provide this functionality, the redirection device 28 may be physically and electrically connected to the input ports of the target computer 4 via serial, USB, and other types of connections. The redirection device 28 may also provide connections for user input devices located at the target computer 4 and may pass through signals received at the user input devices to the target computer 4. In this manner, user input commands generated by a user physically located at the target computer 4 may be passed through to the target computer 4.

Through the use of the plug-in executing within the web browser 12 and the redirection device 28, a user of the host computer 2 can control the operation of the target computer 4 from a remote location. In particular, a user of the host computer 2 can control the operation of the BIOS 16, including the modification of settings provided through configuration, or setup, menus by the BIOS 16. Moreover, a user of the host computer 2 may perform other functions on the target computer 4, such as resetting the target computer 4.

It should be appreciated that although the device shown in FIG. 3 is internal, the redirection device 28 may comprise a device located internal to the target computer 4 or an external device connected to the external connections of the remote computer 4. One example of an external redirection device comprises an external device that may be connected to the external video output of the target computer 4, to the network 6, and to the user input devices located at the target computer 4. Such a device is described in U.S. Pat. No. 7,260,624, entitled "Systems and Methods for Establishing Interaction Between A Local Computer and A Remote Computer", which is assigned to the assignee of the instant patent application and expressly incorporated herein by reference.

Another embodiment may comprise a redirection device that is integrated with the main board of the target computer 4 or contained on an adapter card located within the target computer 4. Such a device is described in U.S. Pat. No. 6,825,846, entitled "Systems and Methods for Capturing Screen Displays From A Host Computing System for Display At A Remote Terminal", which is also assigned to the assignee of the instant patent application and expressly incorporated herein. It should be appreciated that other types of redirection devices may also be utilized.

According to one embodiment of the invention, the redirection device 28 includes a serial port 34 connected to the serial port 24 provided by the target computer 4. The serial port 34 is connected to the serial port 24 by means of a serial cable 25 located external to the target computer 4. The redirection device 28 also includes a LAN adapter 30 for communicating with the network 6. According to this embodiment of the invention, the redirection device 28 further includes a "serial over LAN" software component 32 that is operative to convert data received at the serial port 34 to a format compatible for transmission via the LAN adapter 30 and the network 6. The serial-over-LAN software component 32 is further operative to convert data received from the LAN adapter 30 to a format compatible with the serial port 34. It should be appreciated that another type of software component compatible with another type of non-network communications adapter may be utilized. For instance, when the redirection device is connected to the target computer utilizing a USB connection, a "USB over LAN" software component may be utilized. Similarly, when the redirection device is connected to the target computer with a parallel connection, a "parallel over LAN" software component may be utilized. Other types of conversions may also be made depending upon the type of non-network connection utilized to connect the redirection device and the target computer.

When used in conjunction with a debugger application 8, the redirection device 28 is operative to open a port at the LAN adapter 30 to which all data from the debugger application 8 is directed. Data received at the specified port on the LAN adapter 30 is copied to the non-network adapter, such as the serial port 34, where it in turn is transmitted to the serial port 24 for use by the debugger module 18. Similarly, data received at the serial port 24 is converted by the serial-over-LAN component 32 and transmitted to the debugger application 8 via the LAN adapter 30 and the network 6. In this manner, the debugger application 8 may communicate with the debugger module 18 through a communications path provided by the redirection device 28. Moreover, as described above, a user of the host computer 2 may utilize the redirection device 28 to view the video output of the target computer 4, control the operation of the target computer 4, including powering the target computer 4 on or off, and performing other debugging functions described herein and known to those skilled in the art.

Figure 4:
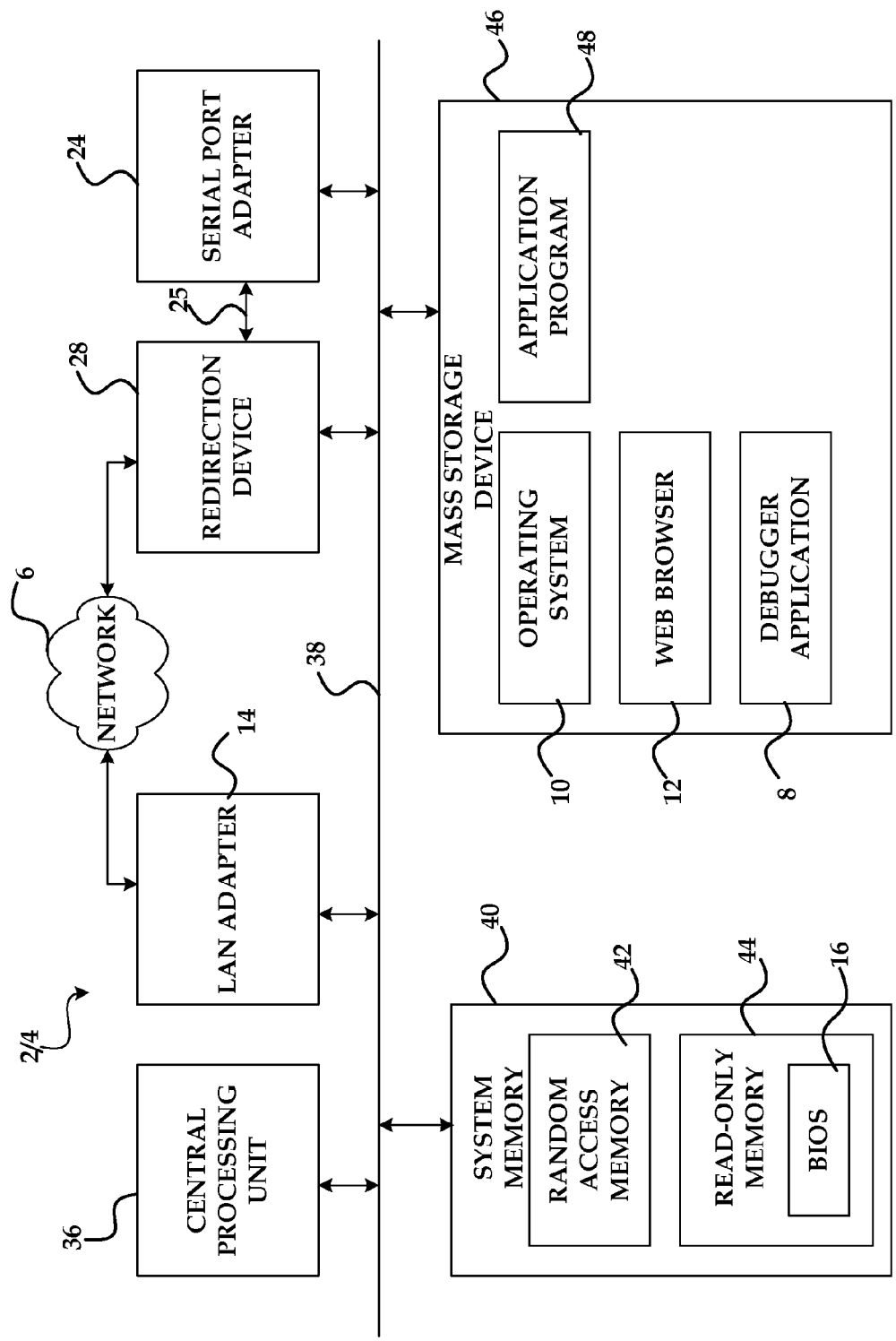
FIG. 4 is a computer architecture diagram illustrating various aspects of a host computer and a target computer provided by the various embodiments of the invention.

Referring now to FIG. 4, an illustrative computer architecture for a host computer 2 and a target computer 4 for practicing the various embodiments of the invention will be described. The computer architecture shown in FIG. 4 illustrates a conventional server or personal computer, including a central processing unit 36 ("CPU"), a system memory 40, including a random access memory 42 ("RAM") and a read-only memory ("ROM") 44, and a system bus 38 that couples the memory to the CPU 36. A basic input/output system 16 ("BIOS") containing the basic routines that help to transfer information between elements within the computer, such as during startup, is stored in the ROM 44. As discussed above, the BIOS 16 may include a PXE environment 20 and/or a debugger module 18 and may be stored in a flashable non-volatile random access memory, rather than in a ROM.

The computer illustrated in FIG. 4 further includes a mass storage device 46 for storing an operating system 10 suitable for controlling the operation of a networked computer, such as the WINDOWS NT or XP operating systems from MICROSOFT CORPORATION of Redmond, Wash. or the LINUX operating system. The mass storage device 46 also stores application programs 48, such as the debugger application 8, the web browser 12, and data.

The mass storage device 46 is connected to the CPU 36 through a mass storage controller (not shown) connected to the bus 38. The mass storage device 46 and its associated computer-readable media, provide non-volatile storage for the computer. Although the description of computer-readable media contained herein refers to a mass storage device, such as a hard disk or CD-ROM drive, it should be appreciated by those skilled in the art that computer-readable media can be any available media that can be accessed by the computer illustrated in FIG. 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should be included within the scope of computer-readable media. Computer-readable media may also be referred to as a computer program product.

According to various embodiments of the invention, the computer illustrated in FIG. 4 may operate in a networked environment using logical connections to remote computers through a network 6, such as the Internet or a LAN. The computer may connect to the network 6 through a network interface unit 14 connected to the bus 38. It should be appreciated that the network interface unit 14 may also be utilized to connect to other types of networks and remote computer systems. The computer may also include an input/output controller (not shown) for receiving and processing input from a number of devices, including a keyboard, mouse, or electronic stylus (not shown in FIG. 4). An input/output controller may also provide output to a display screen, a printer, or other type of output device.

The computer illustrated in FIG. 4 also includes a redirection device 28. As described above, the redirection device may comprise an internal or external device. The redirection device 28 receives and compresses the video output of the computer for transmission over the network 6. The redirection device 28 also transmits the compressed screen displays to a plug-in executing on a remotely located computer, where the data may be decompressed and displayed. Because the redirection device 28 is implemented in hardware, operation of the redirection device 28 is not dependent on the execution of a particular type of operating system 10. Moreover, because the redirection device 28 is implemented in hardware, the operating system 10 does not have to be loaded by the computer for the screen displays of the computer to be compressed and transmitted. In this manner, the computer may be remotely controlled immediately after it is powered on and without the need to load any operating system.

As discussed briefly above, the redirection device 28 also includes input/output ports for connecting peripheral input devices that would otherwise be connected to the computer. In particular, a mouse and keyboard (not shown in FIG. 4) may be directly connected to the redirection device 28. Input commands received by these devices may then be passed by the redirection device 28 to the input/output controller of the computer shown in FIG. 4. Additionally, user input commands may also be received by a plug-in executing within a web browser at a remote computer. These commands are transmitted by the plug-in to the redirection device 28. The remotely generated commands are also passed from the redirection device 28 to the input/output controller of the computer shown in FIG. 4 for execution on the computer as if the commands were generated locally. In this manner, the operation of the computer shown in FIG. 4 may be completely controlled from a remote computer.

It should be appreciated that for convenience purposes the computer illustrated in FIG. 4 includes both a debugger application 8 and a redirection device 28. However, as shown and described above with respect to FIGS. 1-3, in embodiments of the invention the host computer 2 includes a debugger application 8 and the target computer includes the redirection device 28. It should further be appreciated that because the redirection device 28 operating system is independent, no operating system need be present or executing on the target computer 4. In this manner, a user of the host computer 2 can remotely debug aspects of the BIOS 16 on the target computer 4 by utilizing the various features of the redirection device 28 for redirecting video and input to the web browser 12. A user of the host computer 2 can also utilize these features of the redirection device 28 to interact with the BIOS 16 and to turn the target computer 4 on or off.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, firmware, in special purpose digital logic, and any combination thereof without deviating from the spirit and scope of the present invention as recited within the claims attached hereto.

Figure 5:
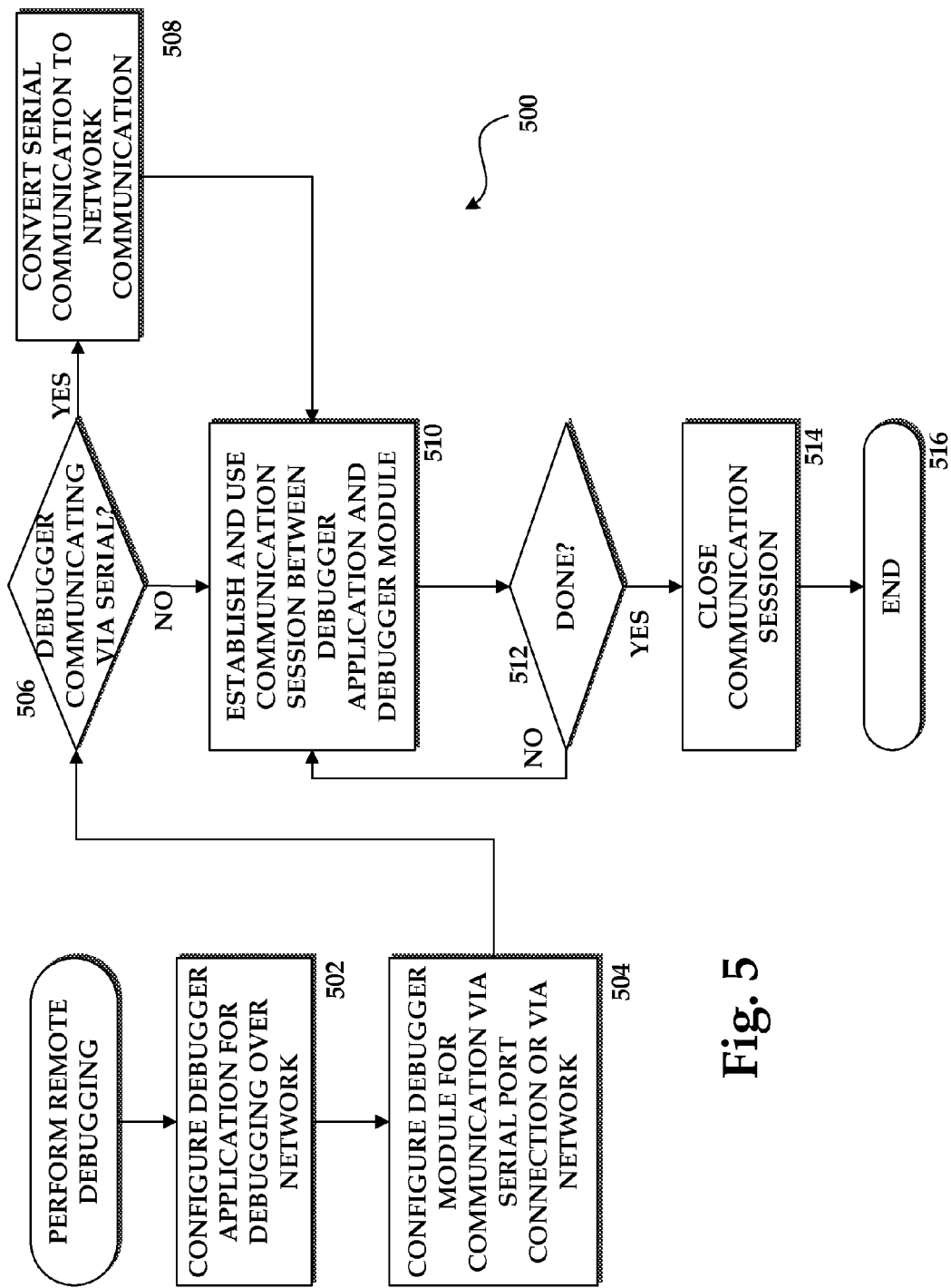
FIG. 5 is a flow diagram illustrating a process for performing remote software debugging according to one embodiment of the invention.

Turning now to FIG. 5, a routine 500 will be described illustrating an illustrative process for remote debugging of software, such as a computer BIOS. The routine 500 begins at operation 502, where the debugger application 8 is configured for debugging software over a network. This may include, for instance, specifying an Internet protocol ("IP") address for the LAN adapter contained within the target computer 4, the bridge 26, or the redirection device 28 and a port utilized for such communication. From block 502, the routine 500 continues to operation 504, where the debugger module 18 is configured for communication via a non-network adapter, such as a serial port adapter 24, or via a network adapter, such as a LAN adapter 22. As described above with respect to FIG. 1, the debugger module 18 may be configured for use with a LAN adapter 22 if the BIOS supports the PXE component 20. Otherwise, the debugger module 18 is configured for use with the serial port adapter 24.

From block 504, the routine 500 continues to decision operation 506, where a determination is made as to whether the debugger module 18 is communicating via a non-network adapter, such as a serial port adapter 24, or network adapter, such as a LAN adapter 22. If the debugger module 18 is communicating via the serial port adapter 24, the routine 500 branches to operation 508. At operation 508, the non-network serial data communication is converted to a format compatible with the network 6 and the communication received from the network 6 is converted to a format compatible with the non-network serial port adapter 24. As discussed above with respect to FIG. 2, this conversion may be performed by the serial-to-network bridge 26. Alternatively, this conversion may be performed by a software component executing in conjunction with the operation of the redirection device 28. From operation 508, the routine 500 continues to operation 510.

If, at operation 506, it is determined that communication is occurring via the LAN adapter 22, the routine 500 continues to operation 510. At operation 510, the established communication session between the debugger module 18 and the debugger application 8 is utilized to transmit commands and data for debugging the software component executing on the target computer 4. The routine 500 then continues to operation 512, where a determination is made as to whether the communication session has been ended. If the communication session has not ended, the routine 500 branches back to operation 510 where the debugging session continues. If, however, the communication session has completed, the routine 500 continues to block 514, where the data communications link between the debugger application 8 and the debugger module 18 is closed. The routine 500 then continues to block 516, where it ends.

Although the various embodiments of the invention have been described herein as utilizing a serial port adapter 24, a serial-to-network bridge 26, and a redirection device 28 that includes a serial port 34, it should be appreciated that other types of locally connected non-network communications ports may be utilized in place of a serial adapter. For instance, USB, parallel, FIREWIRE, SCSI, and other types of connections may be utilized in a manner similar to that described herein.

Based on the foregoing, it should be appreciated that the various embodiments of the invention provide methods and systems for remotely debugging a software program. The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for remote software debugging, the system comprising:
   a target computer operative to execute a basic input/output system (BIOS), the BIOS comprising a debugger module operative for receiving and responding to debugging commands from a host computer; and
   a redirection device internal to the target computer and coupled to the target computer by way of a non-network communications adapter and by way of an internal connection to a video output circuit, and connected to a network, the redirection device operative to:
      receive video output from the target computer,
      transmit the video output to the host computer,
      receive the debugging commands from a debugger application executing on the host computer, and
      transmit the debugging commands to the debugger module of the target computer.

2. The system of claim 1, further comprising the host computer executing the debugger application, the host computer operative to receive the video output from the redirection device and display the video output.

3. The system of claim 2, wherein the debugger application is operative to identify an error within the BIOS executing on the target computer and transmit the debugging commands to the debugger module.

4. The system of claim 2, wherein the host computer is further operative to receive user input commands directed toward the target computer and to transmit the user input commands to the redirection device, and wherein the redirection device is further operative to receive the user input commands and to provide the user input commands to the target computer.

5. The system of claim 1, wherein the redirection device is further operative to receive debugging data from the debugger module of the target computer and transmit debugging data to the debugger application executing on the host computer.

6. The system of claim 1, wherein the video output comprises a screen display provided by the BIOS.

7. A method for remote software debugging, the method comprising:
   receiving, at a redirection device internal to a target computer, video output from the target computer through an internal connection to a video output circuit of the target computer;
   transmitting, from the redirection device, the video output to a host computer;
   receiving, at the redirection device, debugging commands from a debugger application executing on the host computer; and
   transmitting, from the redirection device, the debugging commands to a debugger module of the target computer.

8. The method of claim 7, wherein the debugging commands comprise a first command to upload a new version of a basic input/output system (BIOS) executing on the target computer and a second command to program the new version of the BIOS into a non-volatile storage area of the target computer storing the BIOS.

9. The method of claim 8, wherein the video output comprises a screen display provided by the BIOS.

10. The method of claim 7, further comprising:
    receiving, at the host computer, the video output from the redirection device; and
    displaying, at the host computer, the video output.

11. The method of claim 7, further comprising:
    identifying, at the debugger application, an error within a basic input/output system (BIOS) executing on the target computer; and
    transmitting, from the debugger application, the debugging commands to the debugger module.

12. The method of claim 7, further comprising:
    receiving, at the host computer, user input commands directed toward the target computer;
    transmitting the user input commands from the host computer to the redirection device;
    receiving the user input commands at the redirection device; and
    providing the user input commands from the redirection device to the target computer.

13. The method of claim 7, further comprising transmitting, from the debugger module of the target computer, debugging data to the debugger application via the redirection device.

14. A system for remote software debugging, the system comprising:
    a target computer comprising a non-network communications adapter, the target computer operative to execute a basic input/output system (BIOS), the BIOS comprising a debugger module operative for communication with a host computer via the non-network communications adapter; and
    a redirection device internal to the target computer and coupled to the non-network communications adapter of the target computer, a video output circuit of the target computer by way of an internal connection, and to a network, the redirection device comprising a network adapter and a non-network communications adapter, the redirection device operative to:
       receive video output from the target computer, the video output including a screen display generated by the BIOS executing on the target computer,
       compress the video output,
       transmit the compressed video output to a host computer,
       open a port at the network adapter of the redirection device to which communications from a debugger application executing on the host computer are directed,
       convert the communications received from the debugger application to a format compatible with the non-network communications adapter of the redirection device and the non-network communications adapter of the target computer,
       copy the converted communications from the debugger application to the non-network communications adapter of the redirection device, and
       transmit the converted communications from the non-network communications adapter of the redirection device to the non-network communications adapter of the target computer.

15. The system of claim 14, further comprising the host computer executing the debugger application, the host computer operative to receive the video output from the redirection device and display the video output.

16. The system of claim 15, wherein the debugger application is operative to identify an error within the BIOS executing on the target computer and transmit the debugging commands to the debugger module.

17. The system of claim 15, wherein the host computer is further operative to receive user input commands directed toward the target computer and to transmit the user input commands to the redirection device, and wherein the redirection device is further operative to receive the user input commands and to provide the user input commands to the target computer.

18. The system of claim 14, wherein the debugger module of the target computer is operative to transmit debugging data to the debugger application via the redirection device.

* * * * *